United States Patent
Pinkston

(10) Patent No.: US 7,059,690 B1
(45) Date of Patent: Jun. 13, 2006

(54) VISUAL AIR BRAKE NOTIFICATION DEVICE

(76) Inventor: Tony Pinkston, 1035 Cornishville Rd., Harrodsburg, KY (US) 40330

(*) Notice: Subject to any disclaimer, the term of this patent is extended or adjusted under 35 U.S.C. 154(b) by 0 days.

(21) Appl. No.: 11/038,801

(22) Filed: Jan. 21, 2005

(51) Int. Cl.
*B60T 8/88* (2006.01)
*B60T 17/22* (2006.01)
*B60Q 1/26* (2006.01)

(52) U.S. Cl. ............ 303/122.15; 303/191; 118/1.11 R; 116/39; 116/51

(58) Field of Classification Search ............... 303/123, 303/191, 122.15; 188/1.11 R, 1.11 W, 1.11 L, 188/1.11 E, 73.1; 340/453, 454; 116/271–273, 116/275, 39, 51
See application file for complete search history.

(56) References Cited

U.S. PATENT DOCUMENTS

| 506,787 | A | * | 10/1893 | Dunwell ................. 116/36 |
| 3,651,457 | A | | 3/1972 | Sprouse |
| 4,185,268 | A | | 1/1980 | Sakakibara |
| 4,201,974 | A | * | 5/1980 | Fima ..................... 340/454 |
| 4,800,991 | A | | 1/1989 | Miller |
| 4,819,995 | A | * | 4/1989 | Lohmann et al. ......... 303/113.2 |
| 5,394,137 | A | | 2/1995 | Orachek |
| 5,474,154 | A | * | 12/1995 | Coale .................... 188/1.11 L |
| 5,572,187 | A | | 11/1996 | Williford |
| 6,112,859 | A | | 9/2000 | Shuck et al. |
| 6,891,468 | B1 | * | 5/2005 | Koenigsberg et al. ...... 340/453 |

* cited by examiner

*Primary Examiner*—Melody M. Burch

(57) ABSTRACT

A brake notification device for notifying an individual whether the brake system is active or inactive includes a housing including a flexible conduit having opposed end portions removably connected thereto and to a pneumatically controlled valve of the vehicle brake system. Such a housing selectively receives air under first and second pressure levels for selectively adapting between active and inactive modes respectively. The conduit has a sufficient length for extending between front and rear portions of the vehicle and the housing is adjustably mountable adjacent to a rear portion of the vehicle, and preferably inside the vehicle, at a selected height so a forklift operator can readily identify whether the vehicle brake system is active or inactive.

3 Claims, 5 Drawing Sheets

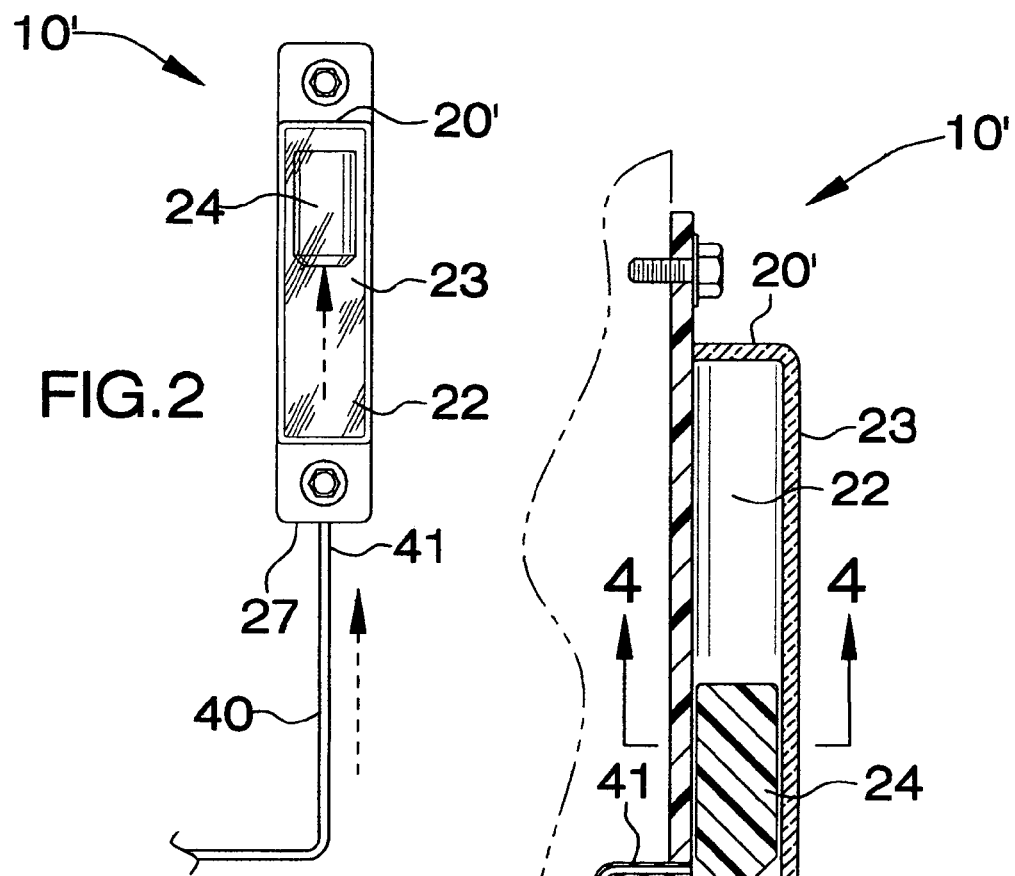
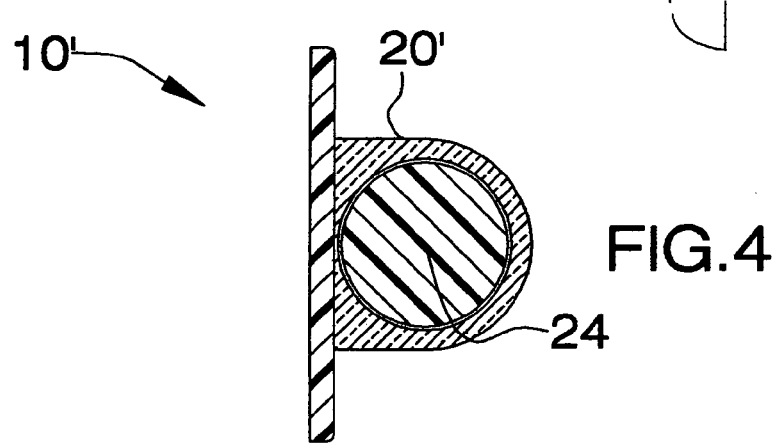

VISUAL AIR BRAKE NOTIFICATION DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to brake notification devices and, more particularly, to a visual air brake notification device positioned within a trailer for notifying a forklift operator whether a trailer's air brakes have been locked prior to entering the trailer from a dock, for example.

2. Prior Art

Trailers and other cargo transportation vehicles are often backed up to docks during loading and unloading operations. A forklift operator drives a forklift vehicle between a warehouse and the trailer by passing through bay doors at the dock. In order to insure the forklift operator can readily and safely move the forklift vehicle back and forth between the trailer and the warehouse, the trailer must be securely parked and in a stationary position. Accordingly, a trailer's air brakes must be locked to ensure the forklift operator can operate in a safe manner.

Unfortunately, forklift operators cannot determine whether a trailer's air brakes have been locked. They must either ask the driver or visually inspect the brakes. This can become a tedious and time consuming task and may not always be performed due to inclement whether conditions or limited knowledge about trailers' air braking systems. The driver is not always available at the time of unloading due to their need for rest or nourishment after a long road trip delivering the goods.

Accordingly, a need remains for a visual air brake notification device positionable within a trailer to overcome the above-noted shortcomings. The present invention satisfies such a need by providing a device that is small in size, highly visible, provides protection, and is easy to use. Such a device provides an easily viewed visual indicator as to whether or not the brakes have been set properly, and thereby can reduce the likelihood of accidents caused by unlocked brakes.

BRIEF SUMMARY OF THE INVENTION

In view of the foregoing background, it is therefore an object of the present invention to provide a visual air brake notification device. These and other objects, features, and advantages of the invention are provided by a notification device mountable to an existing vehicle air brake system for notifying a forklift operator whether the system is active or inactive.

The device includes a housing formed from non-corrosive material and is sized and shaped for providing visual notification to a forklift operator loading and unloading cargo into the vehicle. The housing is shaped like a flag pivotal along one end portion thereof along a selected arcuate path wherein the active and inactive modes are defined along adjacent quadrants. It is noted the flag is most preferably positioned within the trailer.

The housing includes a flexible conduit having opposed end portions removably connected thereto and to a pneumatically controlled valve of the vehicle brake system for selectively receiving air under first and second pressure levels and for selectively adapting between active (air off) and inactive (air on) modes respectively. Such a conduit has a sufficient length for extending between front and rear portions of the vehicle. The housing is adjustably mountable adjacent a rear portion of the vehicle, preferably inside the trailer, and at a selected height so a forklift operator loading and unloading cargo into the vehicle can advantageously readily identify whether the vehicle brake system is active or inactive. The conduit has a non-linear path traveling downwardly and forwardly of the vehicle. Such a conduit is formed from rigid material for advantageously accommodating repeated fluctuations between the first and second pressure levels during operating conditions.

The device further includes a mechanism for adapting the housing between active and inactive modes. The adapting mechanism includes a chamber including an actuating shaft having opposed end portions extending rearwardly therefrom. The chamber causes the actuating shaft to extend and retract along a rectilinear path during active and inactive modes. A pivot arm including first and second portions is operably connected to one actuating shaft end portion. An elongated support rod having opposed end portions is operably connected to the second pivot arm portion and the housing wherein the elongated support rod passes through the housing. The pivot arm cooperates with the actuating shaft for adapting the support rod between raised and lowered positions during the active and inactive modes respectively wherein the housing is caused to pivot along a selected arcuate path during the active mode.

In an alternate embodiment, the housing may have a generally cylindrical shape that defines a hollow chamber therein. Such a housing is secured to a conspicuous rear portion of the vehicle, preferably within the trailer, so a forklift operator can conveniently visualize the housing from approximately 90 degrees offset from a centrally disposed longitudinal axis in clockwise and counterclockwise directions respectively. Such a housing is provided with a transparent outer surface extending substantially parallel to the axis and defining a line of sight into the housing. Such a housing further includes a mobile brake indicator movable along the axis in a rectilinear path between raised and lowered positions and corresponding to the active and inactive modes of the vehicle brake system. The conduit is preferably secured to a lower portion of the housing and is directed inwardly therethrough.

The brake indicator is caused to travel upwardly within the cavity when the vehicle brake system is active and the first pressure level is introduced into the housing. The mobile brake indicator is caused to travel downwardly within the cavity when the vehicle brake system is inactive and the second pressure level is introduced into the housing. Such a first pressure level corresponds to an active vehicle brake system and is greater than the second pressure level which corresponds to an inactive vehicle brake system. The housing may also include a rear surface provided with surface indicia for assisting a spectator to effectively visualize whether the vehicle brake system is active or inactive.

Such indicia may be selected from the group including the colors red, green and a combination thereof.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged front elevational view of the device shown in FIG. 1;

FIG. 3 is a cross-sectional view of the alternate embodiment of the housing shown in FIG. 2;

FIG. 4 is an enlarged cross-sectional view of the housing shown in FIG. 3, taken along line 4—4;

DETAILED DESCRIPTION OF THE INVENTION

Figure 1:
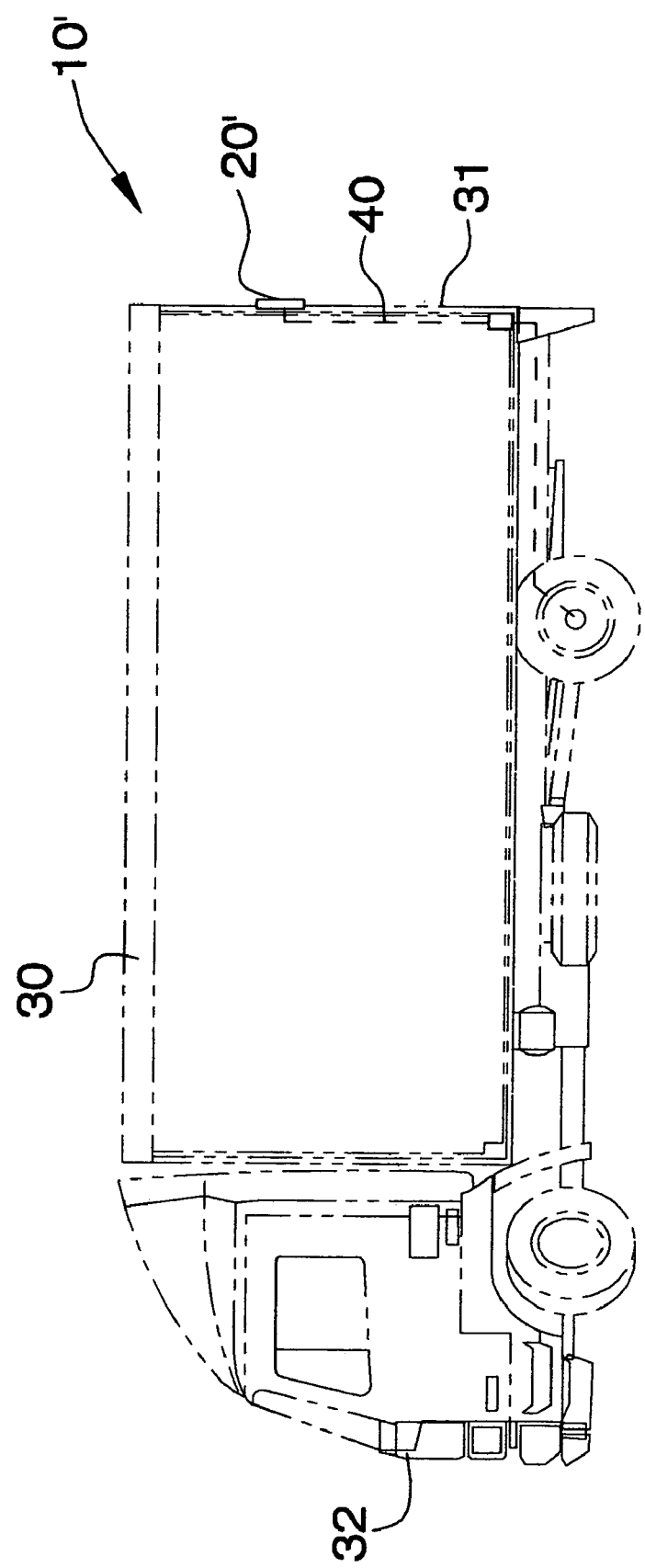
FIG. 1 is a side elevational view showing an alternate embodiment of a visual brake notification device in accordance with the present invention.
Figure 5:
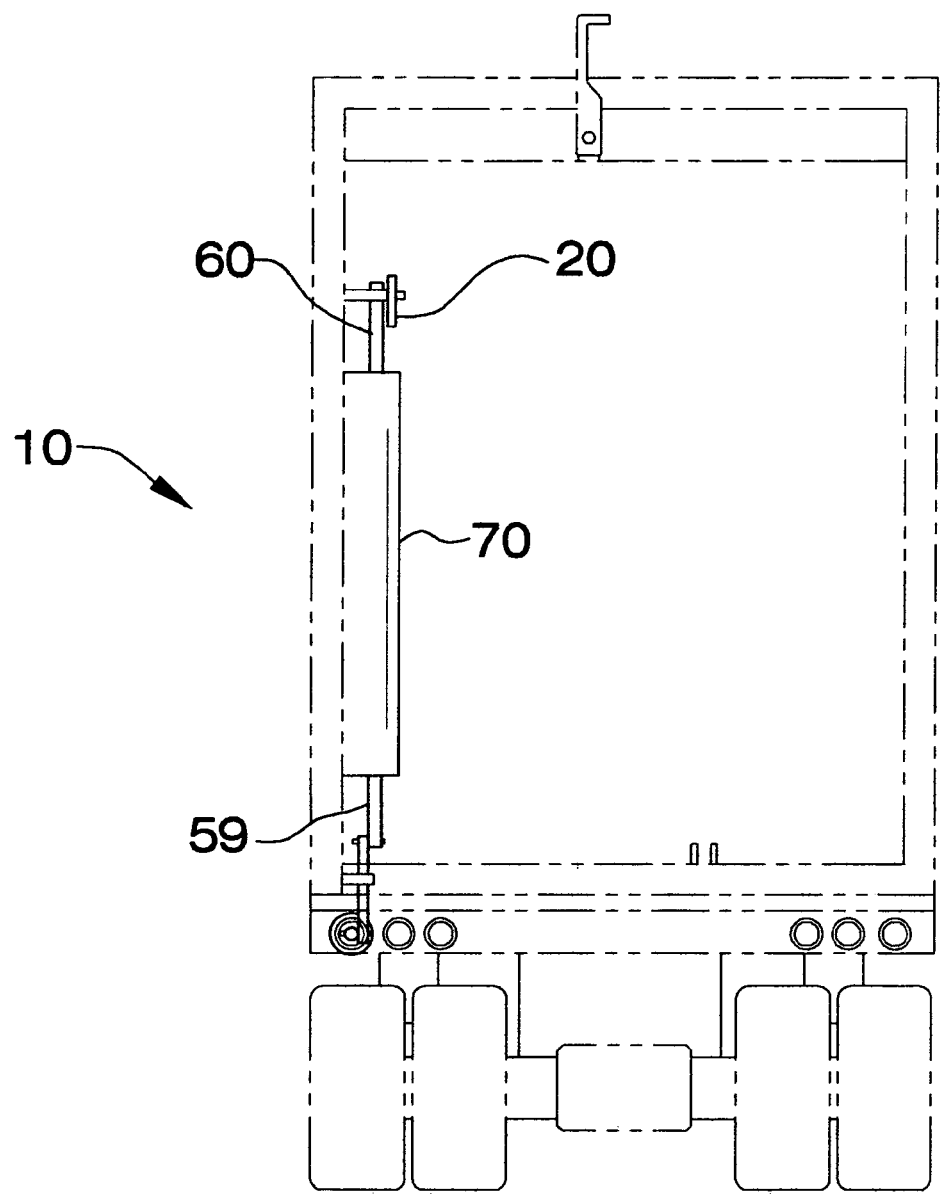
FIG. 5 is a rear elevational view showing the housing positioned inside the trailer.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1–7 by the reference numeral 10 and is intended to provide a visual air brake notification device. It should be understood that the device 10 may be used to provide notification of activation of many different types of braking systems and should not be limited to only air brake systems. Also, it is noted the device is most preferably positioned within the trailer so a forklift operator can readily identify whether the air braking system has been engaged.

Figure 6:
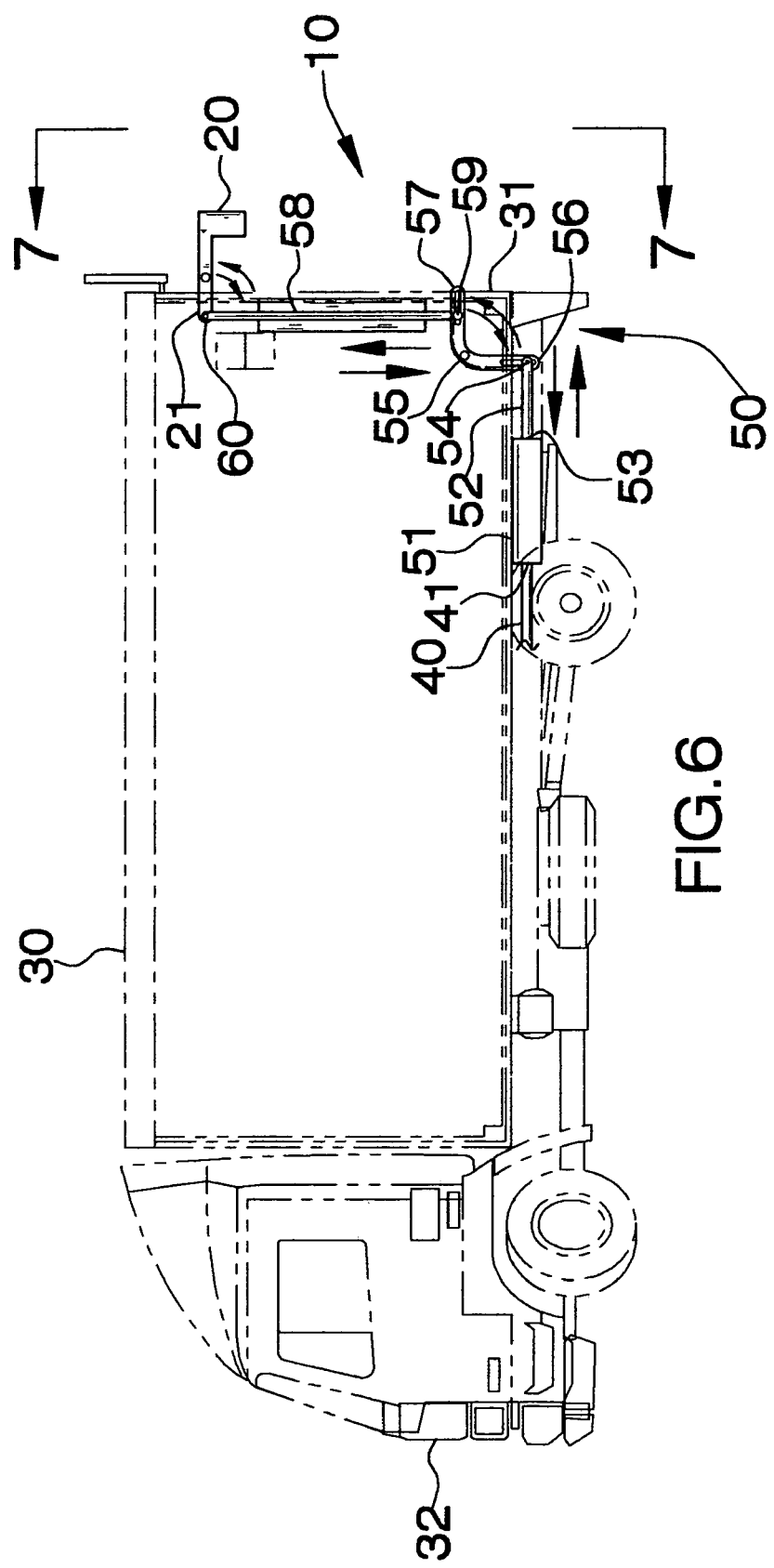
FIG. 6 is a side elevational view of the present invention shown in FIG. 5, in a preferred environment.

Referring initially referring to FIG. 6, the device 10 includes a housing 20 formed from non-corrosive material and sized and shaped for providing visual notification to a forklift operator loading and unloading cargo into the vehicle. The housing 20 is shaped like a flag pivotal along one end portion 21 thereof along a selected arcuate path wherein the active and inactive modes are defined along adjacent quadrants. Of course, the housing 20 may have other common notification shapes such as a pennant, triangle, balloon, or other design which would alert a forklift driver to the status of the brakes, as is obvious to one having ordinary skill in the art.

Still referring to FIG. 6, the housing 20 is adjustably mountable adjacent to a rear portion 31 of the vehicle 30, preferably inside the trailer and at a selected height so that a forklift operator can advantageously readily identify whether the vehicle brake system is active or inactive. Such a housing 20 may be positioned outside the trailer for use with refrigerated trucks so a forklift operator can see the housing 20 without opening the trailer doors and thus causing cooled air to escape. The conduit 40 has a non-linear path traveling downwardly and forwardly of the vehicle 30. Such a conduit 40 is formed from rigid material for advantageously accommodating repeated fluctuations between the first and second pressure levels during operating conditions.

Figure 7:
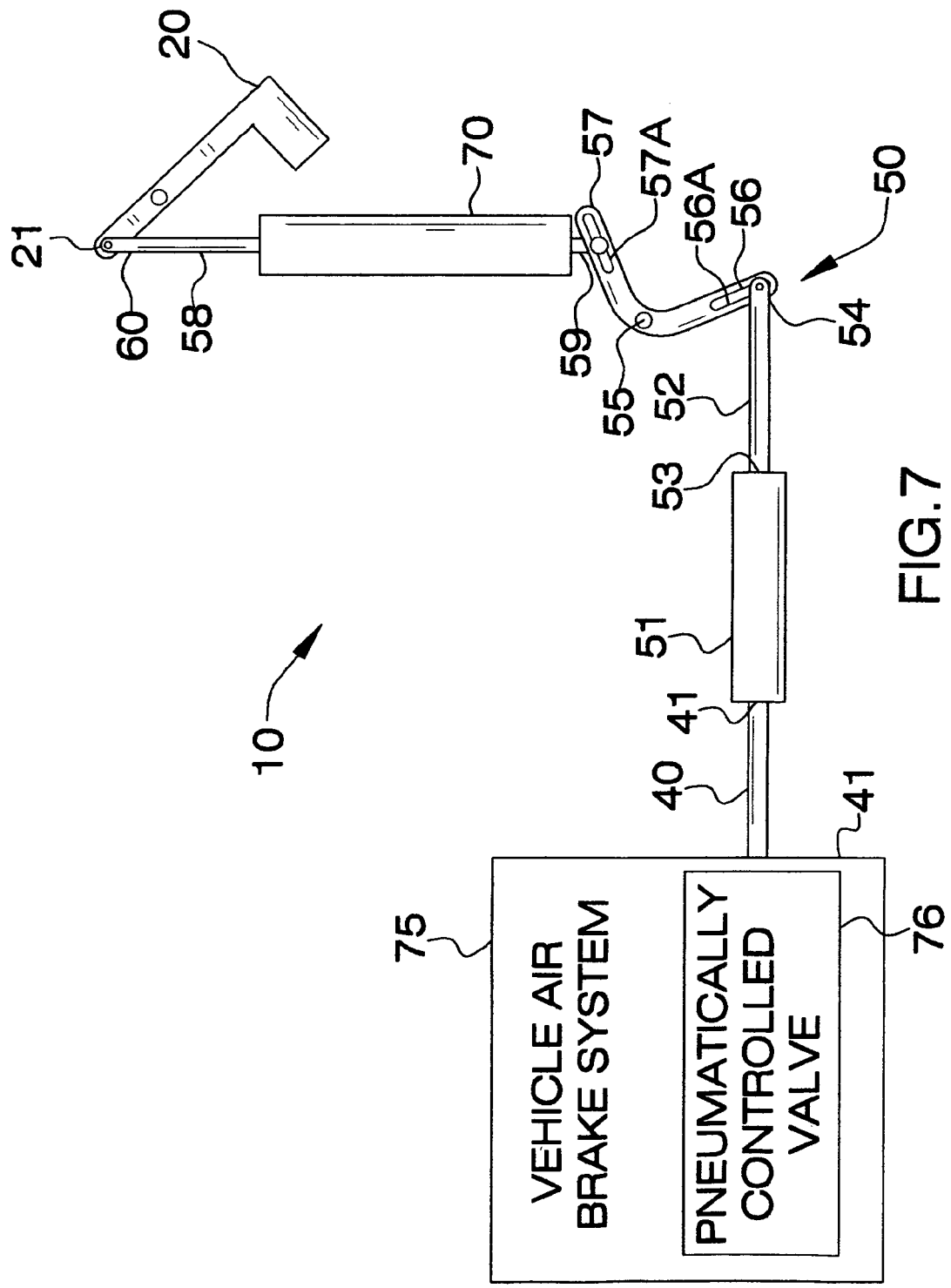
FIG. 7 is an enlarged side elevational view of the adapting mechanism shown in FIG. 6, taken along line 7—7.

Referring to FIG. 7, the device 10 further includes a mechanism 50 for adapting the housing 20 between active and inactive modes. The adapting mechanism 50 includes a flexible conduit 40 having opposed end portions 41 connected thereto and to a pneumatically controlled valve 76 of the vehicle brake system 75 for selectively receiving air under first and second pressure levels and for selectively adapting between active and inactive modes respectively. Such a conduit 40 has a sufficient length for extending between front 32 and rear 31 portions of the vehicle 30. Such flexibility also reduces the stress placed on such a conduit by the shocks and vibrations caused by the frequent bumps and potholes incurred in everyday driving. The adapting mechanism 50 further includes a chamber 51 including an actuating shaft 52 having opposed end portions 53, 54 extending rearwardly therefrom. The chamber 51 causes the actuating shaft 52 to extend and retract along a rectilinear path during active and inactive modes. A pivot arm 55 has a boomerang shape and includes first 56 and second portions 57 provided with first and second linear slots 56A, 57A, respectively. Such slots 56A, 57A adjustably receive shaft end portion 54 and the second portion 59 of the support rod 58 such that the pivot arm 55 can be vertically and horizontally aligned along an x-axis and y-axis, respectively. The first portion 56 is operably directly connected to one actuating shaft end portion 54. An elongated support rod 58 having opposed end portions 59, 60 is operably directly connected to the second pivot arm portion 57 and the housing 20 wherein the elongated support rod 58 passes through a guide member 70. The pivot arm 55 cooperates with the actuating shaft 52 for adapting the support rod 58 between raised and lowered positions during the active and inactive modes respectively wherein the housing 20 pivot arm 55 is caused to pivot along a selected arcuate path during the active mode.

Referring to FIGS. 1–4, in an alternate embodiment 10', the housing 20' has a generally cylindrical shape and defines a hollow chamber 22 therein, as illustrated in FIGS. 2 thru 4. Such housing 20' is secured to a conspicuous rear portion 31 of the vehicle 30', preferably inside the trailer, so a forklift operator can conveniently visualize the housing 20' from approximately 90 degrees offset from a centrally disposed longitudinal axis in clockwise and counterclockwise directions respectively. This advantageously allows a forklift operator to quickly and safely determine whether the trailer's air braking system has been activated to a locked position, prior to entering the trailer. The housing 20' is provided with a transparent outer surface 23 extending substantially parallel to the axis and defining a line of sight into the housing 20'. Such housing 20' further includes a mobile brake indicator 24 movable along the axis in a rectilinear path between raised and lowered positions and corresponding to the active and inactive modes of the vehicle brake system.

As shown in FIGS. 2–4, the brake indicator 24 is caused to travel upwardly within the cavity 22 when the vehicle brake system is active and the first pressure level is introduced into the housing 20'. The mobile brake, indicator 24 is caused to travel downwardly within the cavity 22 when the vehicle brake system is inactive and the second pressure level is introduced into the housing 20'. Such a first air pressure level corresponds to an active vehicle brake system and is greater than the second pressure level which corresponds to an inactive vehicle brake system. The visual notification feature is important for loading docks are busy and noisy places with heavy activity. The conduit 40 is secured to a lower portion 27 of the housing 20' and is directed inwardly therethrough.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A notification device mountable to an existing vehicle air brake system for notifying a forklift operator whether the system is active or inactive, said device comprising:

a housing sized and shaped for providing visual notification to a forklift operator loading and unloading cargo into a vehicle, a chamber for selectively receiving air under first and second pressure levels for being adapted between active and inactive modes respectively, said housing being disposed within a rear portion of the vehicle so that a forklift operator loading and unloading cargo into the vehicle can readily identify whether the vehicle air brake system is active or inactive; and means for adapting said housing between the active and inactive modes, wherein said means for adapting comprises said chamber including an actuating shaft having opposed end portions extending rearwardly therefrom, said chamber causing said actuating shaft to extend and retract along a rectilinear path during the active and inactive modes respectively, a pivot arm including first and second portions each having a slot formed therein, said first pivot arm portion being directly connected to one of said actuating shaft end portions, a guide member disposed adjacent a rear portion of the vehicle and subjacent said housing, an elongated support rod having opposed end portions directly connected to said second pivot arm portion and said housing, respectively wherein said elongated support rod axially passes through said guide member, said pivot arm cooperating with said actuating shaft for adapting said support rod between raised and lowered positions during said active and inactive modes respectively wherein said housing is caused to pivot along a selected arcuate path during said active mode, and a flexible conduit having opposed end portions connected to said chamber and to a pneumatically controlled valve of the vehicle air brake system, said conduit being formed from rigid material and traveling downwardly and forwardly of the vehicle and for accommodating repeated fluctuations between the first and second pressure levels during operating conditions, wherein said housing is shaped like a flag pivotal along one end portion thereof along a selected arcuate path wherein said active and inactive modes are defined along adjacent quadrants.

2. A notification device mountable to an existing vehicle air brake system for notifying a forklift operator whether the system is active or inactive, said device comprising:

a housing formed from non-corrosive material and being sized and shaped for providing visual notification to a forklift operator loading and unloading cargo into a vehicle, said housing being disposed within a rear portion of the vehicle and at a selected height so that a forklift operator loading and unloading cargo into the vehicle can readily identify whether the vehicle air brake system is active or inactive; and means for adapting said housing between active and inactive modes, wherein said means for adapting comprises a chamber including an actuating shaft having opposed end portions extending rearwardly therefrom, said chamber causing said actuating shaft to extend and retract along a rectilinear path during the active and inactive modes respectively, a pivot arm including first and second portions, said first pivot arm portion being directly connected to one of said actuating shaft end portions an elongated support rod having opposed end portions directly connected to said second pivot arm portion and said housing respectively, wherein said elongated support rod axially passes through a guide member said pivot arm cooperating with said actuating shaft for adapting said support rod between raised and lowered positions during said active and inactive modes respectively wherein said housing is caused to pivot along a selected arcuate path during said active mode, said pivot arm having a boomerang shape and including first and second portions provided with first and second linear slots respectively, said slots adjustably receiving said first end portion of said shaft and said second end portion of said support rod respectively such that said pivot arm can be vertically and horizontally aligned along an x-axis and y-axis respectively, and a flexible conduit having opposed end portions connected to said chamber and to a pneumatically controlled valve of the vehicle air brake system, said chamber for selectively receiving air under first and second pressure levels for being selectively adapted between the active and inactive modes respectively, said conduit having a sufficient length for extending between front and rear portions of the vehicle, said conduit being formed from rigid material and traveling downwardly and forwardly of the vehicle and for accommodating repeated fluctuations between the first and second pressure levels during operating conditions, wherein said housing is shaped like a flag pivotal along one end portion thereof along a selected arcuate path wherein said active and inactive modes are defined along adjacent quadrants.

3. A notification device mountable to an existing vehicle air brake system for notifying a forklift operator whether the system is active or inactive, said device comprising:

a housing formed from non-corrosive material and being sized and shaped for providing visual notification to a forklift operator loading and unloading cargo into a vehicle, a chamber for selectively receiving air under first and second pressure levels for being selectively adapted between active and inactive modes respectively; and means for adapting said housing between the active and inactive modes, wherein said means for adapting comprises said chamber including an actuating shaft having opposed end portions extending rearwardly therefrom, said chamber causing said actuating shaft to extend and retract along a rectilinear path during the active and inactive modes respectively, a pivot arm including first and second portions, said first pivot arm portion being directly connected to one of said actuating shaft end portions an elongated support rod having opposed end portions directly connected to said second pivot arm portion and said housing, respectively, wherein said elongated support rod axially passes through a guide member said pivot arm cooperating with said actuating shaft for adapting said support rod between raised and lowered positions during said active and inactive modes respectively wherein said housing is caused to pivot along a selected arcuate path as said housing is adapted between the active and inactive modes said pivot arm having a boomerang shape and including first and second portions provided with first and second linear slots respectively, said slots adjustably receiving said first end portion of said shaft and said second end portion of said support rod respectively such that said pivot arm can be vertically and horizontally aligned along an x-axis and y-axis respectively, and a flexible conduit having opposed end portions connected to said chamber and to a pneumatically controlled valve of the vehicle air brake system, said conduit having a sufficient length for extending between front and rear portions of the vehicle, said housing being adjustably mountable within a rear portion of the vehicle and at a selected height so that a forklift operator loading and unloading cargo into the vehicle can readily identify whether the vehicle air brake system is active or inactive, said conduit having a non-linear path traveling downwardly and forwardly of the vehicle, said conduit being formed from rigid material for accommodating repeated fluctuations between the first and second pressure levels during operating conditions, wherein said housing is shaped like a flag pivotal along one end portion thereof along a selected arcuate path wherein said active and inactive modes are defined along adjacent quadrants.

\* \* \* \* \*